United States Patent [19]

Turk

[11] 3,990,396
[45] Nov. 9, 1976

[54] LITTER BOX FOR PETS
[76] Inventor: Hal Turk, 4931 - 184th Place Southwest, Lynnwood, Wash. 98036
[22] Filed: Mar. 9, 1973
[21] Appl. No.: 339,505

[52] U.S. Cl. .................................................. 119/1
[51] Int. Cl.² ........................................ A01K 29/00
[58] Field of Search ........................................ 119/1

[56] References Cited
UNITED STATES PATENTS

| | | | |
|---|---|---|---|
| 2,741,223 | 4/1956 | Winborn, Jr. | 119/1 |
| 3,227,137 | 1/1966 | Goldman et al. | 119/1 |
| 3,575,140 | 4/1971 | Prepeliczay | 119/1 |
| 3,684,155 | 8/1972 | Smith | 119/1 |
| 3,831,557 | 8/1974 | Elesh | 119/1 |

*Primary Examiner*—Hugh R. Chamblee
*Attorney, Agent, or Firm*—Thomas W. Secrest

[57] ABSTRACT

The subject matter of this writing is directed to a container for holding an absorbent material that is used in the care of household pets, such as cats. The container is of such a design it can be readily cleaned and refilled by a young or an older person with little or no difficulty. It is of such a size and of such lightweight material that it can be moved in the house or living quarters and left where desired.

5 Claims, 6 Drawing Figures

LITTER BOX FOR PETS

BACKGROUND OF THE INVENTION

For many years people have used boxes such as wooden boxes and corrugated boxes to act as a holder for litter from household pets such as cats. In the corrugated box there is placed sand, sawdust or paper, or commercially available materials for absorbing the droppings from the household pets. After the absorbent material has been used for a period of time, say, a week or 10 days, the absorbent material gives off an odor which is unpleasant. It is necessary to clean the box of the absorbent material or else throw away the box of absorbent material. With a corrugated box the liquid in the absorbent material may soak into the corrugated paper and weaken the structure of the corrugated paper. Upon lifting the corrugated box the weakened sides and bottom may fall out of the box scattering the absorbent material and the droppings from the pets on the floor. Such an accident is both bothersome and time consuming in cleaning.

Further, in cleaning the droppings from the pets, such as by lifting the corrugated box of absorbent material or else the spilled absorbent material and droppings on the floor, a person's hands often come in contact with the absorbent material and the droppings. This can pose a health problem as the absorbent material saturated with the droppings is a health hazard. For example, at the present time it appears that the droppings from a cat have a harmful effect on pregnant women and that the embryo may be physically damaged because of a disease carried by the droppings from a cat. If a pregnant woman should, unfortunately, touch the droppings from a cat and which droppings carry a disease there is a possibility that the embryo will not be perfectly formed and that the child will have a deformity. Because of this it is desirable to try and isolate the absorbent material and the droppings so that the person cleaning the litter box does not touch the absorbent material and the droppings.

Further, in certain areas it is difficult to secure wooden boxes and corrugated boxes for holding the absorbent material and the droppings.

BRIEF DESCRIPTION OF THE INVENTION

With this invention a person cleaning such a litter box does not have to handle the absorbent material and the droppings. In fact, the person can readily isolate the absorbent material and the droppings, even to the extent of isolating the resulting odor and smell.

The invention comprises a lightweight box and a top-piece for the box. Also, there is used a flexible liner. The flexible liner is placed in the box with the upper part of the liner overhanging the top walls of the box. Then, the top-piece is placed over the walls of the box so as to lock the flexible liner in place. The absorbent material can be placed in the liner in the box. After a sufficient period of time, when the pets have used the material to such an extent that it can no longer be capable of functioning properly, the person can remove the top-piece of the box, bring together the upper part of the flexible liner and tie together the upper part of the flexible liner so as to form a bag. Then, the bag and the contents of absorbent material and droppings can be disposed of in the garbage or other suitable means.

Further, the box and the top-piece are so designed that if an animal is scratching around on the inside of the box the absorbent material will, generally, not be thrown to the outside of the box but will be directed inwardly towards the interior of the box.

An object of this invention is to provide a litter box for pets such as cats; an additional object is to provide such a litter box which can be readily cleaned by a person without touching the absorbent material and the droppings from the pet; an additional object is to provide such a litter box which can be easily positioned in a corner or in an out of the way place for the pet to use and yet which is not readily visible to the occupants of the house or dwelling; a further important object of the invention is to provide such a litter box having a positive locking for positioning the flexible litter holder in the box; another object is to provide a blocking means in the litter box to prevent absorbent material and litter from being scratched an kicked out of the box; a further object is to provide such a litter box which is inexpensive to manufacture and also which requires, substantially, no maintenance.

These and other important objects and advantages of the invention will be more particularly brought forth upon reference to the detailed description of the invention, the appended claims and the accompanying drawings.

IN THE DRAWINGS

DETAILED DESCRIPTION OF THE INVENTION

Figure 1:
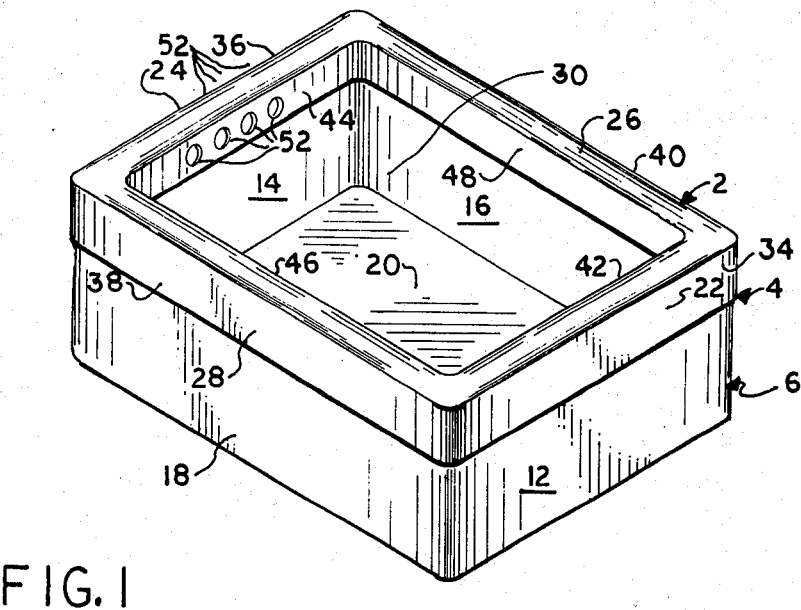
FIG. 1 is a perspective view looking down on the litter box and shows the box proper, the flexible liner in the box and the top-piece for locking the flexible liner in the box.

In FIG. 1 there is a perspective view of a litter box 2 comprising a combination of a top-piece 4, and a box proper 6 or a bottom box 6. The litter box 2 is designed to hold and secure a flexible liner bag 8 that if to be partially filled with an absorbent material 10 such as sand, sawdust, pieces of paper and commercially available materials, see FIG. 2.

With reference to FIG. 1 it is seen that the box proper 6 comprises a first end wall 12, a second end wall 14, a first side wall 16, and a second side wall 18. The box 6 has a bottom wall 20. The bottom box 6 is of a unitary construction having said bottom wall and side walls. There are no seams between the side walls or between the side walls and the bottom wall for allowing liquids and absorbent to pass through from the inside of the box to the outside of the box.

Figure 3:
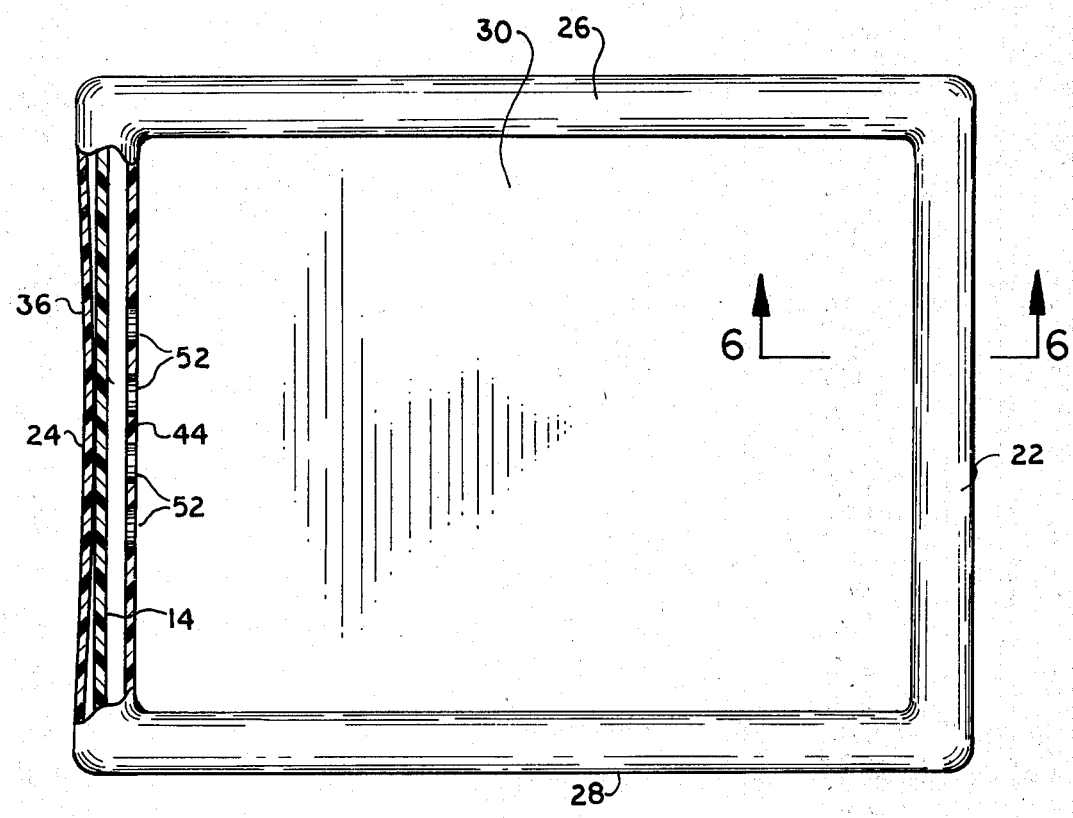
FIG. 3 is a plan view looking down into the litter box and, with part of the rim broken away, illustrating the side wall of the litter box, the inner depending wall and the outer depending wall of the top rim.
Figure 5:
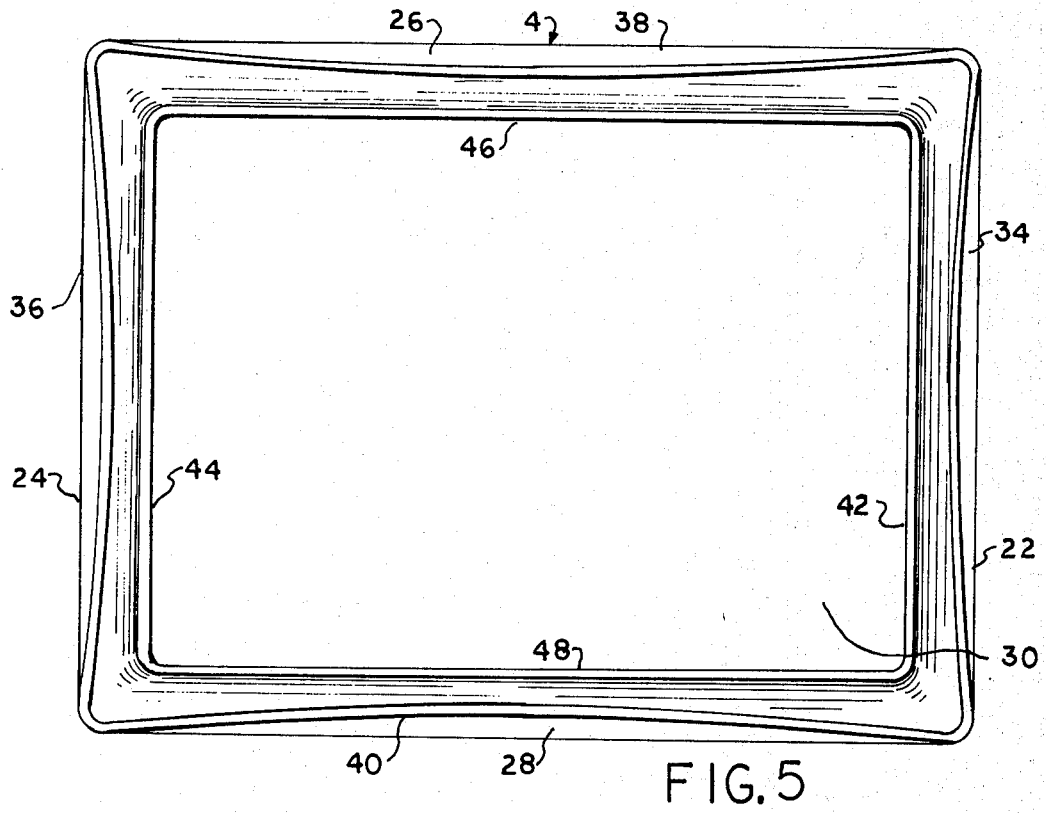
FIG. 5 is a top plan view looking down into the litter box and illustrates the top-piece positioned on the box proper and the flexible liner in the box proper.

The top-piece 4 comprises a first end section 22, a second end section 24, a first side section 26 and a second side section 28. In FIGS. 1, 3 and 5 it is seen that the top sections 22, 24, 26 and 28 define a peripheral rim having an opening 30. The opening 30 is such that a cat may enter or leave the litter box 2 at will. The top-piece 4 may be of unitary construction.

Figure 2:
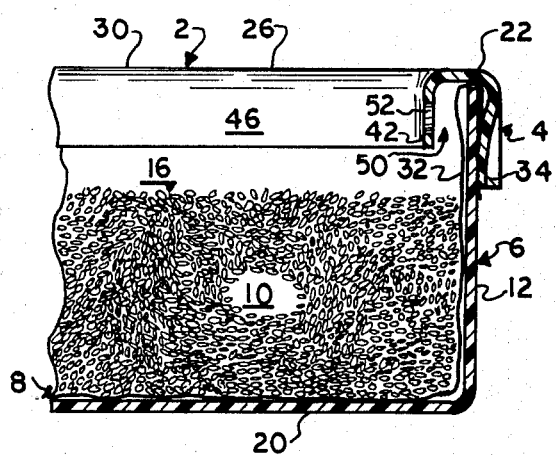
FIG. 2 is a fragmentary vertical cross-sectional view illustrating the box proper, the flexible liner in the box and the top-piece with the outer part of the depending side of the top-piece bearing against the upper part of the side of the box proper and locking the flexible liner in position.

In FIG. 2 it is seen that a plastic liner bag 8 is placed in the litter box 6, and that the sides 32 of the liner bag 8 are folded over the tops of the side walls 16 and 18, and the end walls 12 and 14 of the box 6.

Figure 4:
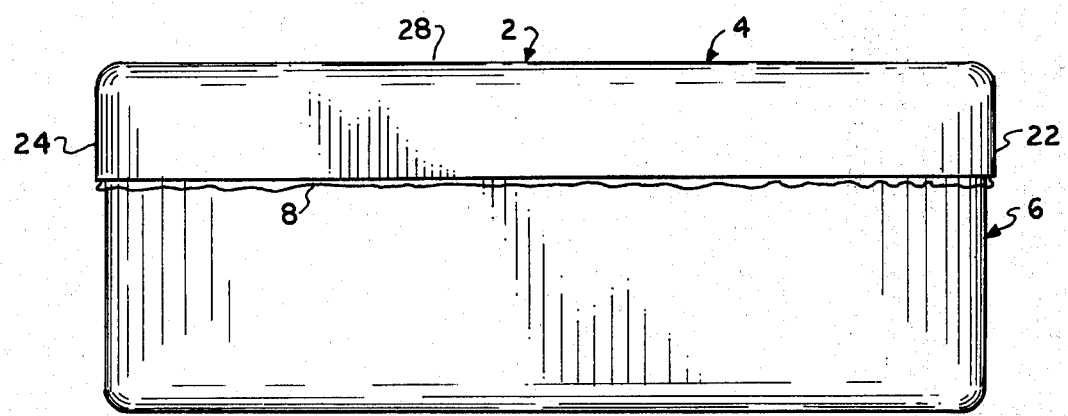
FIG. 4 is a side elevational view of the litter box and illustrates the box proper, part of the flexible liner and the top-piece in position on the box proper.
Figure 6:
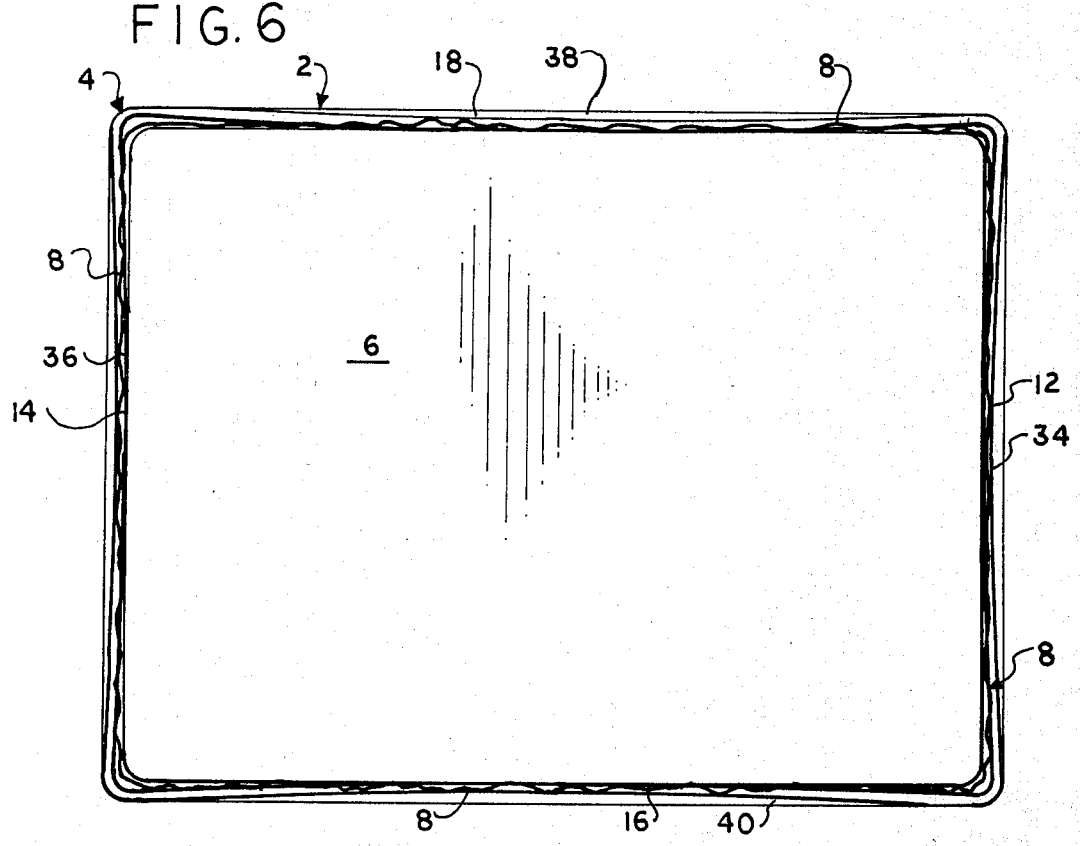
FIG. 6 is an underneath plan view looking at the box proper and the top-piece positioned on the box proper and locking the flexible liner in place in the box proper.

With reference to FIGS. 3, 4 and 6 it is seen that the outer wall 36 of the second end section 24 of the top-piece 4 in the second end section 24, are constructed to curve inwardly toward the endwalls 12 and 14 and, to bear against said end walls so that end walls and end sections function as locks for the sides 32 of the liner bag 8. The outer wall 38 of the first side section 26, and the outer wall 40 of the second side side section 28 are also constructed in the same fashion so as to curve inwardly toward the sidewalls 16 and 18 so that the outer walls 38 and 40 bear against the side walls 16 and 18 to function as a lock to position the sides 32 of the liner bag 8. Also, the inner wall 44 and the inner wall 42 have been provided with finger holes 52 to make for the easy removal of the top-piece 4 from the bottom box 6.

When the outer walls 34 and 36 of the top piece 4 are spread outwardly with the fingertips, the top 4 can, easily, be placed over the sides 12, 14, 16 and 18 of the bottom box 6. It is to be recalled that before the top-piece 4 is placed on the bottom box 6, the liner bag 8 with the sides 32 are draped over the endwalls and the sidewalls. When the outer walls 34 and 36 of the top 4 are released, the walls 34 and 36 will spring inwardly towards the center of the box 6, thereby gripping the sides 32 of the liner bag 8 as shown in FIGS. 1, 2, 3, 5 and 6. The liner bag 8 is then filled with a sufficient amount of absorbent material, and the litter box 2 is ready for use.

In FIGS. 2 and 5 there is illustrated an inner wall 42 of the first end section 22, and an inner wall 44 of the second end section 24. Also, there is an inner wall 46 of the first side section 26, and an inner wall 48 of the second side section 28. When the top 4 is positioned upon the box 6, there is formed the spacing 50, between the inner walls 42, 44, 46 and 48, and the end and side walls 12, 14, 16 and 18 of the box 6. The spacing 50 will keep the absorbent material 10 from being scratched out of the box 2 by the cats. From these Figures and the written description it is seen that the inner members 42, 44, 46 and 48 of the top-piece 4 present an opening smaller than the opening presented by the walls 12, 14, 16 and 18 of the bottom box 6. The resulting spacing 50 functions as a deterrent to the ejection of absorbent material 10 from the litter box 2. The pet claws and kicks the absorbent material 10 but due to the spacing 50 and inner members 42, 44, 46 and 48 the majority of the absorbent material 10 stays in the litter box 2.

The flexible liner bag 8 or the flexible sheet 8 is, substantially, impervious to the passage of aqueous solutions. Some of the droppings are liquid and the flexible sheet 8 must prevent the liquid passing through to the bottom box 6.

The materials of construction of the bottom box 6 and the top-piece 4 can be one of many suitable materials. It is desirable to have a material inert to the droppings of the pet. A satisfactory material is a plastic. There are suitable plastics such as resin reinforced with fiberglass, and which can be made relatively light in weight and yet strong in construction. Further, there can be plastic such as polyethylene, polyvinyl alcohol, polyvinyl chloride, methyl methacrylate and the like. These plastics can be vacuum-formed to the desired configuration. These plastics are inert to the droppings from pets and also are light in weight and strong. Further, many of these plastics can be made in desirable colors to blend with the furniture and rugs in the dwelling unit.

The absorbent material 10 can be one of many absorption materials. As previously stated the absorption material 10 can be sawdust, paper, sand, earth and the like. Also, there are commercially available absorption materials. One of these absorption materials is KITTY CARE, a registered trademark, of the Excel-Mineral Company, Los Angeles, Calif. 90023, and another one is the registered trademark TIDY a product of Lowe's, Cassopolis, Mich., 49031.

From the foregoing and having explained my invention it is seen that I have provided a litter box which can be used for pets such as cats in a dwelling unit. There is placed in the litter box an absorption material for the droppings from the pets. The absorption material, after being used, can be removed from the litter box by folding the flexible sheet material 8 and sealing the flexible sheet material by tying a string around the top or placing rubber bands around the top or else even heat sealing the top and then disposing of the absorption material. The flexible sheet material 8 can be of polyethylene, polyvinyl alcohol, polyvinyl chloride and the like. The person removing the absorption material 10 and the droppings from the pet from the litter box 2 need not touch the absorption material 10 and the droppings. A person can pick up the plastic sheet 8 and seal off the top and seal in the absorption material and the droppings in a sanitary manner without touching the absorption material and the droppings and taking a chance of contacting a disease.

What I claim is:

1. An apparatus for handling the droppings from pets, said apparatus comprising:
   a. a container defining a separate receptacle having a bottom and side walls and end walls and defining a first opening;
   b. a flexible sheet positioned inside of said receptacle;
   c. said flexible sheet being capable of holding an absorbent material;
   d. a separate rim for fitting over said side and said receptacle;
   e. said rim comprising a top section and a depending outer wall having outer end sections and outer side sections which overlie said side walls and end walls and defining a second opening and said top section overlying part of the bottom of said receptacle;
   f. said outer end sections and said outer side sections of said depending outer wall being on the outside of said side walls and end walls and directed toward said outer side walls and end walls;
   g. part of said depending outer wall bearing against said side to, releaseably, lock the rim in position on said receptacle;

h. said depending outer wall being in frictional engagement with side;
i. said flexible sheet extending over said side and outside of said side walls and end walls;
j. said flexible sheet being between said side walls and end walls and said outer end sections and outer side sections of said depending outer wall;
k. said receptacle, said rim and said second opening being of such a size as to permit entry and exit by a household pet into and out of said apparatus;
l. said rim having a depending inner wall having inner end walls and inner side walls; and,
m. said inner end walls and inner side walls being spaced inwardly of said side walls and end walls of said receptacle so as to function to prevent the ejection of droppings from said apparatus by a pet and also to allow the entry and exit of a household pet.

2. An apparatus for handling the droppings from pets, said apparatus comprising:
a. a container defining a separate receptacle having a bottom and side walls and end walls and defining a first opening;
b. a flexible sheet positioned inside of said receptacle;
c. said flexible sheet being capable of holding an absorbent material;
d. a separate rim for fitting over said side and said receptacle;
e. said rim comprising a top section and a depending outer wall having outer end sections and outer side sections which overlie said side walls and end walls and defining a second opening and said top section overlying part of the bottom of said receptacle;
f. said outer end sections and said outer side sections of said depending outer wall being on the outside of said side walls and end walls and directed toward said outer side walls and end walls;
g. part of said depending outer wall bearing against said side to, releaseably, lock the rim in position on said receptacle;
h. said depending outer wall being in frictional engagement with side;
i. said flexible sheet extending over said side and outside of said side walls and end walls;
j. said flexible sheet being between said side walls and end walls and said outer end sections and outer side sections of said depending outer wall;
k. said receptacle, said rim and said second opening being of such size as to permit entry and exit by a household pet into and out of said apparatus;
l. said receptacle being of unitary construction;
m. said rim being of unitary construction; and,
n. said flexible sheet being, substantially, impervious to the passage of aqueous solutions.

3. A container for handling the droppings from pets and comprising a separate receptacle and a separate rim:
a. said receptacle having a bottom, side walls and end walls and defining a first opening;
b. said rim cofits over said receptacle;
c. said rim comprising a top section and a depending outer wall having outer end sections which overlie said side walls and end walls defining a second opening for alignment with said first opening in said receptacle and said top section overlying part of the bottom of said receptacle;
d. said outer end sections and said outer side sections of said depending outer wall being on the outside of said side walls and said end walls, and directed toward said side walls and said end walls;
e. a flexible sheet positioned inside of said receptacle and extending over the outside of said side walls and said end walls;
f. part of said depending outer walls bearing against said flexible sheet to force the flexible sheet against said side walls and said end walls to releasably lock the flexible sheet and the rim in position with respect to said receptacle;
g. said receptacle, said rim and said second opening being of such a size as to permit entry and exit by a household pet into and out of said container;
h. said rim having a depending inner wall; and,
i. said inner wall being spaced inwardly of said side so as to function to prevent the ejection of droppings from said container by a pet.

4. A container according to claim 3 and comprising:
a. said flexible sheet being capable of holding an absorbent material;
b. said rim having a depending inner wall; and,
c. said inner wall being spaced inwardly of said side.

5. A container according to claim 4 comprising;
a. said receptacle being of unitary construction and having side walls and a bottom; and,
b. said rim being of unitary construction and having depending outer walls.

* * * * *